(12) United States Patent
Okazaki et al.

(10) Patent No.: US 7,255,788 B2
(45) Date of Patent: Aug. 14, 2007

(54) CATCHMENT HEADER AND MEMBRANE MODULE UNIT

(75) Inventors: Hiroyuki Okazaki, Nagoya (JP);
Masumi Kobayashi, Nagoya (JP);
Kenji Honjou, Nagoya (JP); Katsuyuki Yanone, Nagoya (JP); Manabu Yanou, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 327 days.

(21) Appl. No.: 10/503,614

(22) PCT Filed: Feb. 6, 2003

(86) PCT No.: PCT/JP03/01241

§ 371 (c)(1),
(2), (4) Date: Aug. 5, 2004

(87) PCT Pub. No.: WO03/066201

PCT Pub. Date: Aug. 14, 2003

(65) Prior Publication Data

US 2005/0218063 A1    Oct. 6, 2005

(30) Foreign Application Priority Data

Feb. 7, 2002    (JP)    ............................... 2002-031414

(51) Int. Cl.
*B01D 63/00* (2006.01)
*B01D 63/04* (2006.01)
*B01D 61/00* (2006.01)

(52) U.S. Cl. ............ 210/232; 210/321.72; 210/321.78; 210/321.8; 210/321.88; 210/321.89; 210/323.2; 210/500.23

(58) Field of Classification Search .................... None
See application file for complete search history.

(56) References Cited

U.S. PATENT DOCUMENTS

| | | | | |
|---|---|---|---|---|
| 4,349,440 A | * | 9/1982 | Esmond | 210/321.74 |
| 4,849,104 A | * | 7/1989 | Garcera et al. | 210/323.2 |
| 5,405,528 A | * | 4/1995 | Selbie et al. | 210/232 |
| 6,214,226 B1 | | 4/2001 | Kobayashi et al. | |
| 6,471,869 B1 | | 10/2002 | Yanou et al. | |

FOREIGN PATENT DOCUMENTS

| | | |
|---|---|---|
| EP | 0931582 A1 | 7/1999 |
| JP | 05-261253 A | 10/1993 |
| JP | 06-000340 A | 1/1994 |
| JP | 06-000342 A | 1/1994 |
| JP | 07-232040 A | 9/1995 |
| JP | 09-099222 A | 4/1997 |
| JP | 11-033370 A | 2/1999 |
| JP | 2002-336658 A | 11/2002 |
| JP | 2002-346343 A | 12/2002 |
| WO | WO99/43767 A1 | 9/1999 |

* cited by examiner

*Primary Examiner*—Krishnan S. Menon
(74) *Attorney, Agent, or Firm*—Fitch Even Tabin & Flannery

(57) ABSTRACT

A catchment header allowing a plurality of membrane modules to be connected thereto, having a tubular catchment part with a Young's modulus of 4.0 GPa or less for collecting and taking out filtrated liquid from the membrane modules, wherein at least a part of the tubular catchment part is covered with a reinforcement member with a Young's modulus of 4.0 to 250 GPa, the tubular catchment part of the catchment header is preferably formed of a synthetic resin, and the cross sectional area thereof perpendicular to the longitudinal direction of the tubular catchment part is preferably 4 to 36 cm$^2$.

16 Claims, 2 Drawing Sheets

CATCHMENT HEADER AND MEMBRANE MODULE UNIT

CROSS-REFERENCED APPLICATION

This application is the National Stage of International Application PCT/JP03/01241, filed Feb. 6, 2003, the complete disclosure of which is incorporated herein by reference, which designated the U.S. and that International Application was not published under PCT Article 21(2) in English.

TECHNICAL FIELD

The present invention relates to a catchment header allowing a plurality of membrane modules to be connected thereto for collecting and delivering filtrated liquid, and to a membrane module unit.

This application is based on Japanese Patent Application No. 2002-31414, the content of which is incorporated herein by reference.

BACKGROUND ART

Various methods have been studied to carry out a solid-liquid separation for liquid to be treated using membrane modules provided with a separation membrane, such as a microfiltration membrane and an ultrafiltration membrane, in water treatment of sewage, drainage, etc. It is possible to obtain treated water of high quality when a filtration process of liquid to be treated is carried out using a separation membrane.

When a solid-liquid separation of liquid to be treated is carried out using a filtration membrane, since clogging of separation membrane due to suspended substances (SS) progresses as the filtration process continues, problems, such as reduction of filtration rate and increase in pressure difference between membranes, occur. In order to recover from such state, a technique is known in which a diffuser is disposed below a membrane separation device and air is diffused during a filtration process or when a filtration process is stopped.

A method for carrying out a stable solid-liquid separation using a hollow fiber membrane module in which a hollow fiber membrane of a sheet shape is fixed to a rectangular housing using a resin so as to maintain a constant distance between adjacent membrane modules and air is bubbled from a diffuser so that flow of liquid to be treated is uniformly directed to the membrane modules, is disclosed in Japanese Laid-Open Patent Application, No. Hei 5-261253, Japanese Laid-Open Patent Application, No. Hei 6-342, Japanese Laid-Open Patent Application, No. Hei 6-340, etc.

A method is known in which a plurality of membrane modules are fluid-tightly connected to a tubular catchment header having holes for connecting to the membranes modules so that a constant distance is maintained between adjacent membrane modules and filtered liquid is collected and taken out from the membrane modules.

Various catchment headers have been proposed, such as one in which a resin flat plate having holes for connecting to modules is welded to resin pipes, one in which a metal thick plate having holes for connecting to modules is welded to a metal thin plate which is bent to be in a U-shape, and one in which a metal thick plate having holes for connecting to modules is combined with a resin water passage part.

Although one in which a resin flat plate having holes for connecting to modules is welded to resin pipes can be easily processed as compared with a metallic one, the mechanical strength of a resin pipe which forms a catchment part is weaker than that of a metallic pipe of the same shape.

For this reason, when a catchment header is formed using a resin pipe, the outer diameter of a catchment header has to be made large in order to resist bending stress applied to the catchment header during a bubble washing, etc., for a long period of time. Accordingly, a portion of the header which is not directly involved with a filtration process becomes large, and hence it is difficult to improve the catchment efficiency of a membrane.

Also, when sludge attaches to the surface of a membrane due to some kind of problem and a membrane separation device is pulled out of water in order to solve the problem, a bending stress which is larger than normal may be applied to the catchment header and the header may be broken. Accordingly, it is necessary to increase the diameter of the catchment header so as to withstand a stress which is larger than normal to avoid the breakage, and this leads to further decrease in the catchment efficiency.

Moreover, although there are a catchment header in which a metal thick plate having holes for connecting to modules is welded to a metal thin plate which is bent to be in a U-shape, and in which a metal thick plate having holes for connecting to modules is combined with a resin water passage part, it is necessary to carry out a process for continuously forming a plurality of holes for connecting to modules in a metal thick plate for these catchment headers and such a process is quite difficult to perform. Furthermore, as for welding to a metallic thin plate, it is not easy to perform continuous welding without causing distortion in a longitudinal direction and, for example, 5 to 6 mm flexure would be generated in both horizontal and vertical directions due to thermal distortion of welding when a 70 cm catchment header is produced by welding. Accordingly, it is difficult to orderly arrange a plurality of membrane modules with a distorted catchment header.

In addition, there is a danger that welding will become insufficient and the welded portions may be separated during use of a long period of time, causing leakage of liquid.

The present invention has been achieved in consideration of solving the above-mentioned problems, and objects thereof include to provide a light-weight and compact catchment header which is excellent in workability and is capable of carrying out a solid-liquid separation process using a separation membrane in a stable manner for a long period of time.

DISCLOSURE OF INVENTION

Accordingly, the first aspect of the present invention provides a catchment header allowing a plurality of membrane modules to be connected thereto, including: a tubular catchment part having a Young's modulus of 4.0 GPa or less for collecting and taking out filtrated liquid from the membrane modules, and a reinforcement member having a Young's modulus of 4.0 GPa to 250 GPa which covers at least a part of the tubular catchment part.

Also, it is preferable that the tubular catchment part be formed of a synthetic resin since it can be easily molded at low cost.

Also, it is preferable that a cross-sectional area of the tubular catchment part perpendicular to a longitudinal direction of the tubular catchment part be 4 to 36 cm$^2$ since the size thereof can be made compact yet a sufficient amount of filtrate can be passed through.

Also, it is preferable that the tubular catchment part include a plurality of members which are connected in series since an arbitrary length of the catchment header can be obtained.

Also, it is preferable that the reinforcement member is formed of a metal, a filler reinforced plastic, or a fiber reinforced plastic since the strength thereof can be improved.

The second aspect of the present invention provides a membrane module unit, including: a plurality of membrane modules, and one of the above-mentioned catchment header to which the plurality of membrane modules are connected.

Also, it is preferable that the membrane modules be hollow fiber membrane modules in which bundle ends of a hollow fiber membrane of a sheet shape are accommodated inside a housing of a rectangular shape and fluid-tightly fixed using a fixing member since the catchment efficiency of the membrane can be improved.

BEST MODE FOR CARRYING OUT THE INVENTION

Hereinafter, the present invention will be explained in detail.

Figure 1:
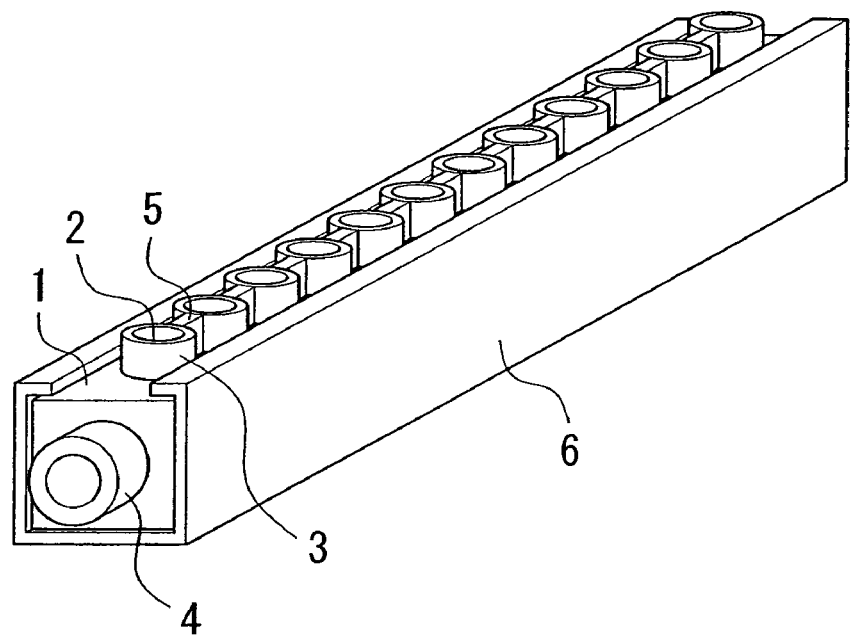
FIG. 1 is a diagram showing a perspective view of a catchment header according to an embodiment of the present invention.

FIG. 1 is a diagram showing a perspective view of a catchment header according to an embodiment of the present invention. In FIG. 1, a tubular catchment part 1 includes a membrane module connection part 3 in which membrane module connection holes 2 are formed at the center. The inside of the tubular catchment part 1 is hollow so that filtrated liquid from the membrane modules can be collected and passed therethrough. A filtered liquid outlet 4 is disposed at one or both ends of the tubular catchment part 1.

It is preferable that the tubular catchment part 1 be formed using a resin since it becomes easy to process. Examples of the resin include a thermoplastic resin, such as a vinyl chloride resin, a polyolefin resin, a polystyrene resin, an ABS resin, a polycarbonate resin, a polyamide resin, a polyester resin, a denatured polyphenylene ether resin, and a polyacetal resin. It is preferable to use a resin which does not contain a reinforcement filler as a material for the tubular catchment part 1 since the shape thereof is complicated and fluid-tightness is required for an engaging portion.

With regard to the shape of the tubular catchment part 1, it is possible to adopt one shown in FIG. 1 in which the cross-section in the vertical direction with respect to a longitudinal direction thereof is rectangular, or it is possible to make it in other polygonal shapes, a circle, an oval, and so forth.

Although the membrane module connection part 3 may be one in which holes for connecting to membrane module are formed on a flat plate-shape member, it is possible to make it as one having a protruded shape as shown in FIG. 1. It is preferable to make it a protruded shape in terms of decreasing torsion during its formation and maintaining precision.

Also, when the protruded shape is adopted, it is preferable to form adjacent protruded portions so as to be connected via a linking member 5 since this increases the strength thereof.

Figure 2:
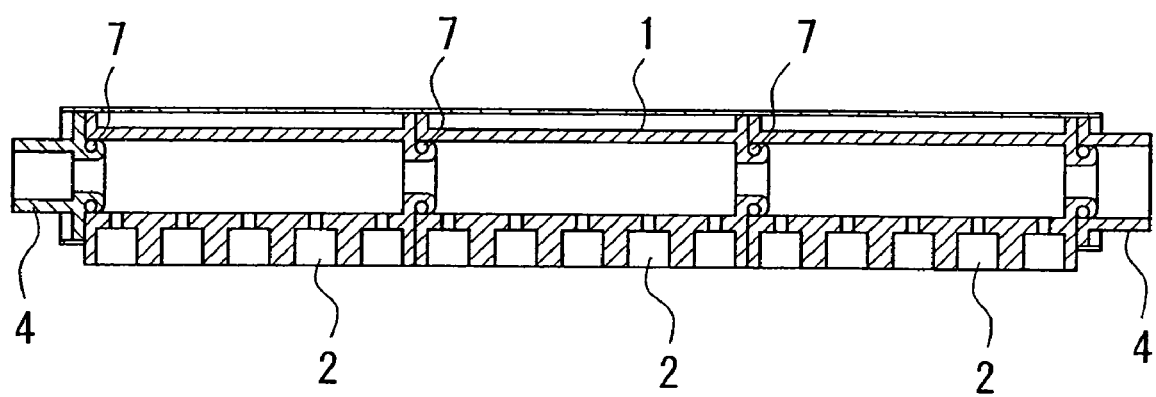
FIG. 2 is a diagram showing a cross-sectional view of a catchment header according to an embodiment of the present invention.

FIG. 2 is a diagram showing a cross-sectional view of a catchment header according to an embodiment of the present invention. As shown in FIG. 2, it is preferable to form one tubular catchment part 1 by connecting a plurality of members in series since a catchment header of arbitrary length can be easily obtained.

In an example shown in FIG. 2, one block of the tubular catchment part 1 has a size in which five membrane modules can be connected, and each block has a projection at one end thereof so that it may be fluid-tightly engaged with the inside of the adjacent block via sealing members 7. A flange portion is fixed to the both ends thereof. The filtered liquid outlet 4 is disposed at one end or both ends of the flange portion.

If the number of the membrane modules that can be connected to one block becomes too large, the length of the block becomes too long. If the number of the membrane modules that can be connected is too small, on the other hand, the number of blocks becomes too large and hence economically inefficient. Accordingly, the number of the membrane modules that can be connected to one block is preferably 5 to 20, and more preferably 7 to 15.

Note that the method for connecting the adjacent blocks is not particularly limited, and may be suitably selected, depending on assemble workability and intended use, from a mechanical connecting method, a heat melting connection method, a connecting method using an adhesive, and so forth. The mechanical connecting method may be preferable in consideration of ease of disassembly and recycling.

Examples of the mechanical connection methods include screw fastening, fastening using pins and retaining rings, snap fitting, press fitting, caulking, and so forth. As for the screw fastening, loosening of connection due to creep of a resin, and creep destruction due to too much tightening must be considered. Assembly may be easy when the snap fitting method is adopted; however, a spring force must always be applied to the claw to achieve sufficient fluid-tightness, and hence it is necessary to design the structure by taking into account the stress generated at the base portion of the claw. Accordingly, among these mechanical connection methods, the fastening using pins and retaining rings which does not generate constitutive remaining stress at connected portions of molded members is particularly preferable.

As for the sealing member 7, an O-ring, a flat packing, a V-ring, etc., may be employed; however, use of an O-ring having high reliability in sealing property is preferable. The material used for the sealing member 7 may be suitably selected, depending of intended use, from a nitrile rubber, a styrol rubber, a fluorinated rubber, and so forth.

The cross-sectional area of the tubular catchment part 1 perpendicular to the longitudinal direction is preferably 4 to 36 $cm^2$, more preferably 9 to 25 $cm^2$, since the pressure loss would become large and it becomes difficult to increase the filtration amount if the area is too small, and the catchment efficiency would be reduced if the area is too large.

A reinforcement member 6 is disposed around the tubular catchment part 1. The shape of the reinforcement member 6 is not necessarily limited as long as a required strength can be obtained; however, it is preferable to arrange it so as to surround the tubular catchment part 1 around the shape of the outside of the tubular catchment part 1. Also, although the reinforcement member 6 can surround the entire tubular catchment part 1, it is preferable to arrange it so as to surround the portions thereof except the membrane module connection part 3 since the shape thereof can be simplified in this manner.

Moreover, the reinforcement member 6 can be reticulated or in the form of a grid as long as it maintains a required strength.

The reinforcement member 6 prevents the catchment header from being deformed due to bending stress and torque applied to the catchment header, and the strength thereof, in terms of a Young's modulus which is expressed as a ratio between stress and a length of torsion in the direction of the stress, is 4.0 to 250 GPa when a stretching or compressing stress vertical to the longitudinal direction of the reinforcement member 6 is applied.

The bending stress which is expected to be applied to the catchment header during its use is about 60-100 MPa. Accordingly, if the Young's modulus of the reinforcement member 6 is less than 4.0 GPa, the strength thereof is insufficient for use over a long period. On the other hand, use of a material having a Young's modulus greater than 250 GPa is not preferable since its hardness becomes too high to be fragile and it is extremely difficult to process such a material.

By arranging the reinforcement member 6 around the tubular catchment part 1, it becomes possible to use the tubular catchment part 1 having the Young's modulus of 4.0 GPa or less, and in this manner it becomes possible to make it compact and readily processed while maintaining the strength of the catchment header.

Note that the Young's modulus is determined, depending on the material used, in accordance with a testing method, such as JIS K7113 (a plastic tensile testing method), JIS Z2241 (a metal material tensile testing method), and JIS K7073 (a carbon fiber reinforced plastic tensile testing method).

It is preferable that the material used for the reinforcement member 6 have an excellent anti-corrosion property, strength, and workability, and the material is preferably one of a metal, a filler reinforced plastic, and a fiber reinforced plastic. Examples of the metal include stainless steel, titanium, aluminum alloy, magnesium alloy, etc., and examples of the filler reinforced plastic and fiber reinforced plastic include one in which filler, glass fiber, carbon fiber, etc., is contained in an ABS resin, a polyamide resin, a polycarbonate resin, a polyacetal resin, a denatured polyphenylene ether resin, etc. One having the above-mentioned range of Young's modulus can be suitably selected among these.

Although a membrane module to be connected is not particularly limited, it is preferable to use a flat plated shape membrane module when a membrane module unit is produced, since it is easily washed and difficult to clog and can be used for filtration for a long period of time in a stable manner. In particular, use of a hollow fiber membrane module 12 shown in FIG. 3 in which a hollow fiber membrane 9 is expanded to be flat and an end portion thereof is fixed to a housing 11 using a fixing member 10, is preferable since the catchment efficiency thereof can be improved while maintaining an excellent cleaning property.

Examples of material used for the hollow fiber membrane include one which is conventionally known, such as cellulose, polyolefin, polysulfone, polyvinyl alcohol, polymethylmethacrylate, vinylidene polyfluoride, polytetrafluoroethylene, etc., and use of a polyolefin material having excellent stretching property, such as polyethylene and polypropylene, is preferable from the viewpoint of workability, accommodation of vibrations during air diffusion, and so forth.

Although a method for connecting the membrane module to the catchment header is not limited as long as the fluid-tightness can be obtained, it is preferable to dispose an O-ring at a filtered liquid outlet of the membrane module and to fix it by inserting the filtered liquid outlet into a hole formed in the catchment header since the membrane filter can be fixed in a fluid-tight manner with a simple procedure and detachment of the membrane module becomes possible.

Figure 3:
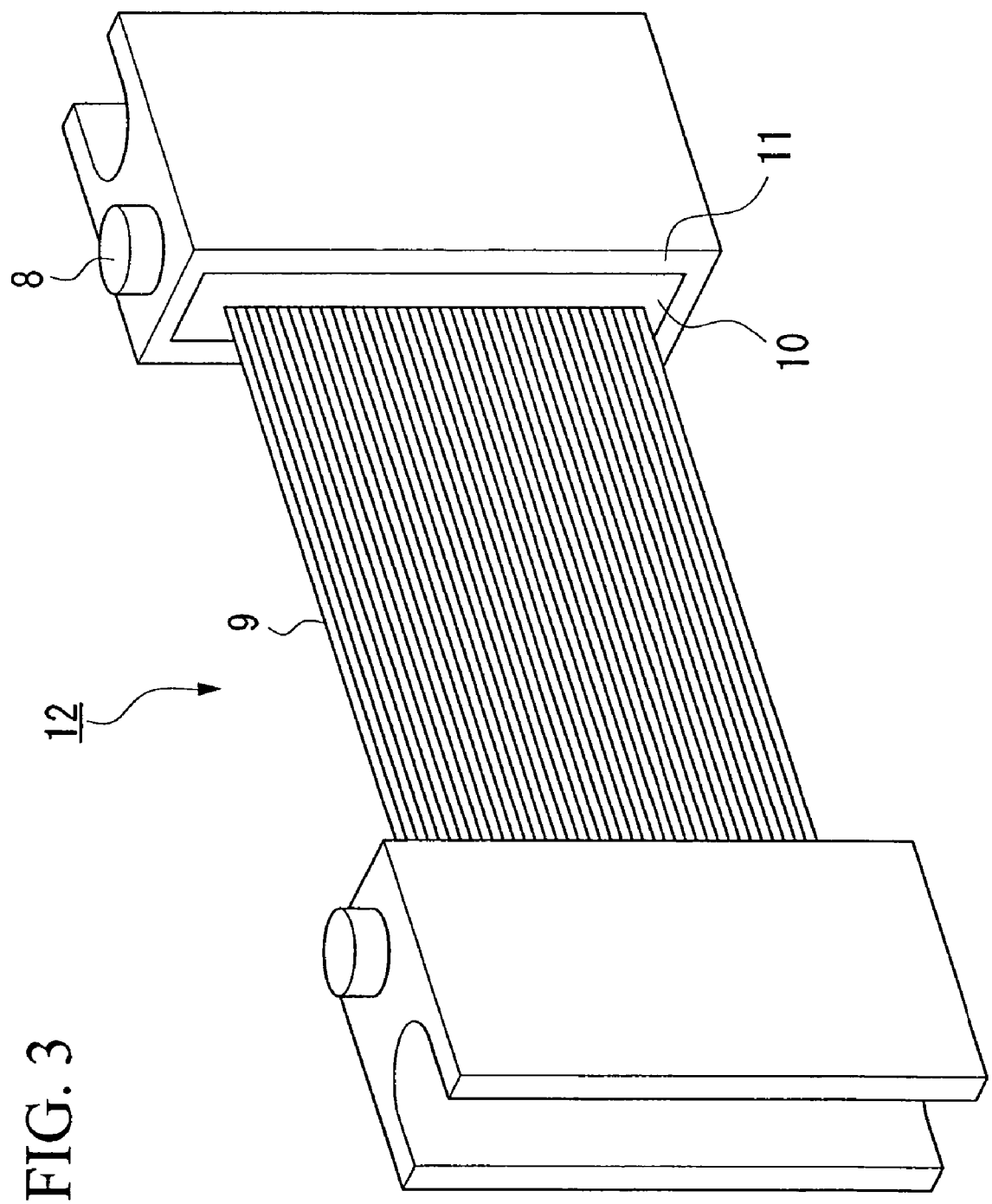
FIG. 3 is a diagram showing a perspective view of an example of a hollow fiber membrane module used in the present invention.

Although arbitrary number of catchment headers may be used in accordance with the shape of the membrane module, the number of filtered liquid outlets, etc., it is preferable that the catchment header be disposed so that the flow of filtered liquid from each of the membrane modules to the catchment header is as uniform as possible. For example, for the case in which the filtered liquid outlet 8 is provided at both ends of the hollow fiber membrane as shown in FIG. 3, it may be preferable to provide two catchment headers with one membrane module unit. Also, although the filtered liquid outlet 8 is disposed at one end of a catchment tube at both sides of the hollow fiber membrane in FIG. 3, it is possible to dispose the filtered liquid outlet 8 at both ends of the catchment tube. In such a case, four catchment headers may be provided with one membrane module unit.

Moreover, it is possible to provide the membrane module in a zigzag arrangement. In such a case, it is possible to use a catchment header in which holes for connecting to membrane modules are formed in a zigzag manner, or two catchment headers may be arranged so as to be shifted relative to each other.

Note that when a membrane module unit is formed using a sheet shape hollow fiber membrane module which is expanded to be flat, it is preferable to arrange it so that the sheet surface faces a vertical direction from the viewpoint of cleaning efficiency. In such a case, the fiber axis direction of the hollow fiber membrane is arranged so as to face a horizontal direction or a vertical direction.

Hereinafter, the present invention will be concretely explained

EXAMPLE 1

An ABS resin (trade name: Diapet ABS, SW3, a product of Mitsubishi Rayon Co., Ltd.) was subjected to injection molding and a tubular catchment part having a structure shown in FIG. 2 and a substantially square cross-sectional area in a vertical direction with respect to a longitudinal direction was produced.

The number of membrane modules to be connected to one block was 10, and four blocks were connected via sealing members of O-rings formed of a NBR rubber. The adjacent flanges were fixed using 4 mm screws.

The shape of the flange portions was substantially a square of 4×4 cm having a thickness of 4 mm. A filtered liquid outlet was attached to both ends of the tubular catchment part via sealing members of O-rings formed of a NBR rubber, and was fixed using 4 mm screws.

A stainless steel plate having a Young's modulus of 200 GPa and a thickness of 1.5 mm as a reinforcement member was folded so as to surround the overall length of the tubular catchment part except the membrane connection parts, and the height, width, and length thereof were, 4.5 cm, 4.5 cm, and 84 cm, respectively.

The distortions in the horizontal and vertical directions of the catchment header obtained in this embodiment with respect to the length direction thereof was 1.5 mm or less in both horizontal and vertical directions.

Also, the maximum bending moment of the catchment header when a uniformly distributed load of $9.8\times10^{-2}$ N/m was applied was 0.9 N·m, and the maximum bending stress was about 87 MPa, which is less than ⅕ of the stress that can lead to failure. Accordingly, the catchment header possesses a strength sufficient so as not to break during use.

INDUSTRIAL APPLICABILITY

According to the catchment header of the present invention, since at least a part of the tubular catchment part is covered with a reinforcement member having a Young's modulus of 4.0 to 250 GPa, a light-weight and compact catchment header which has excellent workability and dimensional accuracy, and has sufficient strength, is obtained. Accordingly, a solid-liquid separation process using a separation membrane can be stably carried out over a long period of time.

The invention claimed is:

1. A catchment header comprising: a tubular catchment part including a plurality of membrane module connection parts at the side surface and having a Young's modulus of 4.0 GPa or less for collecting and removing filtrated liquid from a plurality of membrane modules, and a reinforcement member having a Young's modulus of 4.0 GPa to 250 GPa which covers at least a part of the side surface of the tubular catchment part.

2. A catchment header according to claim 1, wherein said tubular catchment part is formed of a synthetic resin.

3. A catchment header according to claim 1 or 2, wherein a cross-sectional area of said tubular catchment part perpendicular to a longitudinal direction of the tubular catchment part is 4 to 36 cm².

4. A catchment header according to any one of claims 1 or 2, wherein said tubular catchment part comprises a plurality of members which are connected in series.

5. A catchment header according to any one of claims 1 or 2, wherein said reinforcement member is formed of a metal, a filler reinforced plastic, or a fiber reinforced plastic.

6. A catchment header according to any one of claims 1 or 2, further comprising: a connection part having a protruded shape and that is adapted to be connected to a membrane module.

7. A catchment header according to claim 6, wherein said connection part is linked to an adjacent connection part that has a protruded shape via a linking member.

8. A membrane module unit, comprising: a plurality of membrane modules, and a catchment header according to any one of claims 1 or 2 to which said plurality of membrane modules are connected.

9. A membrane module unit according to claim 8, wherein said membrane modules are hollow fiber membrane modules in which bundle ends of a hollow fiber membrane of a sheet shape are accommodated inside a housing of a rectangular shape and are fluid-tightly fixed using a fixing member.

10. A catchment header according to claim 3, wherein said tubular catchment part comprises a plurality of members which are connected in series.

11. A catchment header according to claim 3, wherein said reinforcement member is formed of a metal, a filler reinforced plastic, or a fiber reinforced plastic.

12. A catchment header according to claim 4, wherein said reinforcement member is formed of a metal, a filler reinforced plastic, or a fiber reinforced plastic.

13. A catchment header according claim 5, further comprising: a connection part having a protruded shape and that is adapted to be connected to a membrane module.

14. A catchment header adapted to be immersed in a fluid that is to be filtered, said catchment header adapted to receive and be connected to a plurality of membrane modules which are to be immersed in the fluid to be filtered, said catchment header comprising:

a hollow tubular-shaped catchment part formed from synthetic resin for collecting and removing filtered liquid from a plurality of the membrane modules, wherein said hollow tubular-shaped catchment part has a side surface, a Young's modulus of 4.0 GPa or less, a plurality of membrane module connection parts on said side surface that are each adapted to receive and be connected to a respective membrane module, and at least one outlet for removing the filtered liquid collected from a plurality of membrane modules, and a reinforcement member having a Young's modulus of 4.0 GPa to 250 GPa which covers at least a part of said hollow tubular-shaped catchment part.

15. A membrane module unit adapted to be immersed in a fluid to be filtered that comprises a catchment header according to claim 14; and a plurality of membrane modules connected to said catchment header.

16. A membrane module unit according to claim 15, wherein said plurality of membrane modules comprise hollow fiber membrane modules.

* * * * *